United States Patent
Mirza et al.

(10) Patent No.: US 12,206,717 B1
(45) Date of Patent: *Jan. 21, 2025

(54) PROXY NODE AWARENESS OF ACCESS POINT NAME (APN) OR DATA NETWORK NAME (DNN)

(71) Applicant: T-Mobile USA, Inc., Bellevue, WA (US)

(72) Inventors: Khurram Ahmad Mirza, Bellevue, WA (US); Madhuri Lakshmi Kotta, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,023

(22) Filed: Oct. 13, 2023

(51) Int. Cl.
G06F 15/16 (2006.01)
H04L 65/1045 (2022.01)
H04L 65/1069 (2022.01)

(52) U.S. Cl.
CPC ...... H04L 65/1069 (2013.01); H04L 65/1045 (2022.05)

(58) Field of Classification Search
CPC .......... H04L 65/1069; H04L 65/1045
See application file for complete search history.

(56) References Cited

U.S. PATENT DOCUMENTS

| | | | |
|---|---|---|---|
| 7,596,599 | B1 | 9/2009 | Maghsoodnia et al. |
| 9,019,339 | B2 | 4/2015 | Nicholson et al. |
| 9,369,291 | B2 | 6/2016 | Holm et al. |
| 9,871,828 | B2 | 1/2018 | Mufti et al. |
| 10,462,653 | B1 * | 10/2019 | Verma ............... H04W 12/088 |
| 10,506,506 | B2 | 12/2019 | Qiao et al. |
| 11,711,405 | B2 | 7/2023 | Oyman |
| 11,985,544 | B2 | 5/2024 | Narasimha |

(Continued)

OTHER PUBLICATIONS

Stack Overflow, "P-CSCF Discovery not being initiated in LTE Procedure in an Emulated LTE Network," Retrieved from: www.stackoverflow.com/questions/43376005/p-cscf-discovery-not-being-initiated-in-lte-procedure-in-an-emulated-lte-network on Aug. 2, 2023, 3 pages.

(Continued)

*Primary Examiner* — Padma Mundur
(74) *Attorney, Agent, or Firm* — Foley IP Law, PLLC (57) ABSTRACT

Solutions are disclosed that provide for proxy-call session control function (P-CSCF) awareness of access point name (APN) or data network name (DNN). This permits the P-CSCF to enforce policies regarding use of internet protocol (IP) multimedia subsystem (IMS) resources, such as certain voice codecs (e.g., enhanced voice services, EVS) that use larger amounts of bandwidth, based on the APN/DNN assigned to a user equipment (UE). For example, certain IMS resources may be prioritized for home UEs over mobile virtual network operator (MVNO) UEs, or outbound roamers over inbound roamers, leveraging the P-CSCF's awareness of APN/DNN. In some examples, a packet gateway (PGW) or session management function (SMF) inserts APN/DNN information into a session initiation protocol (SIP) message going to the P-CSCF. In some examples, the P-CSCF retrieves APN/DNN information from a policy and charging rules function (PCRF) or a policy control function (PCF).

20 Claims, 8 Drawing Sheets

(56) References Cited

U.S. PATENT DOCUMENTS

| | | | | |
|---|---|---|---|---|
| 2003/0035401 A1* | 2/2003 | Shaheen | ............... | H04L 67/303 |
| | | | | 370/468 |
| 2010/0128722 A1 | 5/2010 | Madour et al. | | |
| 2013/0195075 A1* | 8/2013 | Keller | ............... | H04W 36/0022 |
| | | | | 370/331 |
| 2019/0364465 A1* | 11/2019 | Frankkila | ........ | H04W 36/00837 |
| 2022/0116750 A1* | 4/2022 | Naik | ................... | H04L 65/1016 |
| 2024/0196178 A1 | 6/2024 | Ying et al. | | |

OTHER PUBLICATIONS

Huawei, HiSilicon, et al, "Support P-CSCF and DNS IPv4 Address in ePCO for N1 mode in Rel-15," Aug. 25, 2020, 15 pages.

Notice of Allowance mailed on Jul. 9, 2024, in U.S. Appl. No. 18/487,013, 9 pages.

\* cited by examiner

PROXY NODE AWARENESS OF ACCESS POINT NAME (APN) OR DATA NETWORK NAME (DNN)

BACKGROUND

A proxy call session control function (P-CSCF) is a session initiation protocol (SIP) proxy that acts as the ingress/egress point between a cellular network and an internet protocol (IP) multimedia subsystem (IMS) for a user equipment (UE) using IMS services. The P-CSCF performs multiple functions, including routing SIP traffic, such as registration and session requests, to the correct nodes in the network: ensuring that the serving call session control function (S-CSCF) is kept updated on the access network (AN) used by the UE; providing session information to the relevant policy control function (PCF) or policy and charging rules function (PCRF); and maintaining a secure connection with the client device. However, because the P-CSCF is not aware on the access point name (APN) or data network name (DNN), it is not able to differentiate which IMS services should be available to a UE, based on the APN or DNN that the cellular network has assigned to a UE.

SUMMARY

The following summary is provided to illustrate examples disclosed herein, but is not meant to limit all examples to any particular configuration or sequence of operations.

Solutions are disclosed that provide for proxy node awareness (e.g., a proxy-call session control function, P-CSCF) of access point name (APN) or data network name (DNN). Examples include: inserting, by a control plane node of a wireless network, into a first session message, a first network name assigned to a first UE; forwarding the first session message with the first network name to a proxy node: extracting, by the proxy node, the first network name from the first session message; and based on at least the first network name and a set of policies associated with a plurality of network names, enforcing a first policy associated with the first network name for a first data session of the first UE that passes through the proxy node.

Additional examples include: receiving, by a proxy node of a wireless network, a first session message indicating a first UE: receiving, by the proxy node, a second session message indicating a second UE: retrieving, from a first control plane node, a first network name assigned to the first UE and a second network name assigned to the second UE; based on at least the first network name and a set of policies associated with a plurality of network names, enforcing a first policy associated with the first network name for a first data session of the first UE that passes through the proxy node; and based on at least the second network name and the set of policies associated with the plurality of network names, enforcing a second policy associated with the second network name for a second data session of the second UE that passes through the proxy node, wherein the first policy prevents use of a resource by the first UE and the second policy permits use of the resource by the second UE.

BRIEF DESCRIPTION OF THE DRAWINGS

The disclosed examples are described below with reference to the accompanying drawing figures listed below, wherein.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Solutions are disclosed that provide for proxy-call session control function (P-CSCF) awareness of access point name (APN) or data network name (DNN). This permits the P-CSCF to enforce policies regarding use of internet protocol (IP) multimedia subsystem (IMS) resources, such as certain voice codecs (e.g., enhanced voice services (EVS) and adaptive multi-rate (AMR) wideband (AMD-WB)) that use larger amounts of bandwidth, based on the APN/DNN assigned to a user equipment (UE). For example, certain IMS resources may be prioritized for home UEs over mobile virtual network operator (MVNO) UEs, or outbound roamers over inbound roamers, leveraging the P-CSCF's awareness of APN/DNN. In some examples, a packet gateway (PGW) or session management function (SMF) inserts APN/DNN information into a session initiation protocol (SIP) message going to the P-CSCF. In some examples, the P-CSCF retrieves APN/DNN information from a policy and charging rules function (PCRF) or a policy control function (PCF).

Aspects of the disclosure improve the efficiency of cellular networks, by introducing a mechanism to prioritize use of IMS resources. The result is that the cellular network requires fewer IMS resources to serve a given number of authorized/prioritized users—or a larger number of authorized/prioritized users may be supported with the same level of resources. These advantageous results are accomplished, at least in part, by extracting, by a proxy node, a network name from a session message and, based on at least the network name and a set of policies associated with a plurality of network names, enforcing a policy associated with the network name for a data session (of a UE) that passes through the proxy node.

Figure 1:
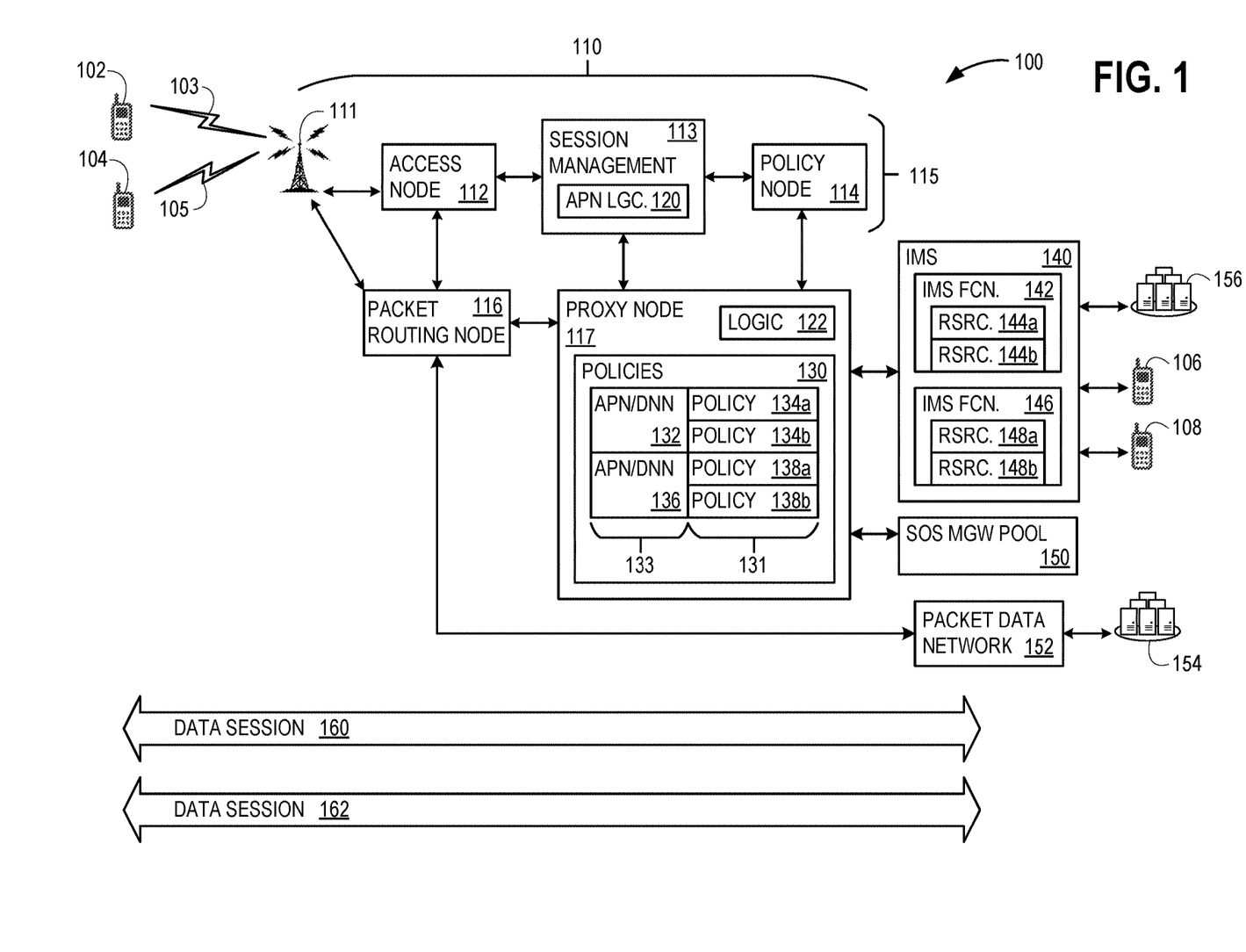
FIG. 1 illustrates an exemplary architecture that advantageously provides for proxy node awareness (e.g., a proxy-call session control function, P-CSCF) of access point name (APN) or data network name (DNN)

With reference now to the figures, FIG. 1 illustrates an exemplary architecture that advantageously provides for proxy node (e.g., P-CSCF) awareness of network name (e.g., APN or DNN). In the scene depicted in FIG. 1, a UE 102 is using wireless network 110 for a phone call with another UE 106, and a UE 104 is also using wireless network 110 for a phone call with another UE 108. UE 102 and UE 104 may each be a cellular telephone, such as a smartphone, but may also represent other telecommunication devices capable of using a wireless network, such as a personal computer (PC, e.g., desktop, notebook, tablet, etc.) with a cellular modem.

Wireless network 110 may be a cellular network such as a fifth-generation cellular technology (5G) network, a fourth-generation cellular technology (4G) network, or another cellular generation network. UE 102 uses an air interface 103 to communicate with a base station 111 of wireless network 110, and UE 104 is also using base station 111 via an air interface 105. In some scenarios, base station 111 may also be referred to as a radio access network (RAN). Wireless network 110 has a control plane 115 comprising an access node 112, a session management node 113, and a policy node 114. Wireless network 110 also has a packet routing node 116 in a user plane, and a proxy node 117.

Base station 111 is in communication with access node 112 and packet routing node 116. Access node 112 is in communication with session management node 113 and session management node 113 is in communication with policy node 114. Packet routing node 116 is in communication with session management node 113, proxy node 117, and an external packet data network 152, such as the internet. In some 5G examples, base station 111 comprises a gNodeB (gNB), access node 112 comprises an access mobility function (AMF), session management node 113 comprises a session management function (SMF), policy node 114 comprises a PCF, and packet routing node 116 comprises a user plane function (UPF).

In some 4G examples, base station 111 comprises an eNodeB (eNB), access node 112 comprises a mobility management entity (MME), session management node 113 comprises a system architecture evolution gateway (SAEGW) control plane (SAEGW-C), and packet routing node 116 comprises an SAEGW-user plane (SAEGW-U). In some examples an SAEGW-C may be referred to, or include, a PGW-control plane (PGW-C), and an SAEGW-U may be referred to, or include, a PGW-user plane (PGW-U). In some examples, proxy node 117 comprises a proxy call session control function (P-CSCF) in both 4G and 5G. In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations.

Proxy node 117 is in communication with an IMS 140, in order to provide connectivity to other wireless (cellular) networks or a public switched telephone system (POTS). In some examples, proxy node 117 may be considered to be within IMS 140. UE 102 reaches a media resource 156 using IMS 140 (which includes an IMS access gateway, IMS-AGW). Data packets, including voice, video, and short message service (SMS), to/from UE 102 pass through base station 111, packet routing node 116, and proxy node 117 on their way to/from IMS 140 and either media resource 156 or UE 106. For other packet data traffic (e.g., generic internet traffic), data packets to/from UE 102 pass through base station 111 and packet routing node 116 on their way to external packet data network 152 and a network resource 154 (e.g., a website).

IMS 140 enables voice calls, video calls, and other communication services such as SMS (commonly-referred to as text messages), multimedia messaging service (MMS), and connectivity to a public switched telephone network (PSTN). IMS 140 also supports interoperability across different devices, networks, and operators such as, for example, providing transcoding from the codec used by one UE in a voice and/or video call does not match the codec (or other voice communication scheme) used by the other side. For examples, UE 102 may use AMR narrowband (AMR-NB) whereas UE 106 using AMR-WB or represents a landline phone on a PSTN that uses the G.711 codec. Some resource within IMS 140 transcodes between AMR-NB and AMR-WB or G.711.

In the scenario depicted in FIG. 1, UE 102 communicates with UE 106 using a data session 160 that passes through proxy node 117 to/from IMS 140, and UE 104 communicates with UE 108 using a data session 162 that also passes through proxy node 117 to/from IMS 140. In such a scenario, transcoding for data sessions 160 and 162, which occurs within IMS 140, is invoked by proxy node 117. Thus, proxy node 117 should be configured to only invoke the authorized transcoding and other services within IMS 140. The authorizations are contained within policies 130.

IMS 140 is shown as having a pool of IMS functions, including an IMS function 142 and an IMS function 146. IMS functions 142 and 146 represent and relevant IMS nodes, servers, or other capabilities, such as an AGW or media gateway (MGW) with transcoding capability, or another IMS entity. IMS functions 142 and 146 are each illustrated as having resources, for example, IMS function 142 has a resource 144a and a resource 144b, and IMS function 146 has a resource 148a and a resource 148b. For purposes of describing the example scenario herein, resource 144a and resource 148a are the same resource, an EVS codec, and resource 144b and resource 148b are also the same resource, an AMR-NB codec. It should be understood, however, that other examples of architecture 100 may have a larger number of IMS functions, each with a larger number of resources, and resources may vary among IMS functions.

When UE 102 attaches to wireless network 110, session management node 113 uses APN assignment logic 120 to assign an IMS function to UE, typically based on the status of UE 102. UE 102 may be a home (non-roaming) subscriber, an MVNO subscriber, an inbound roamer, or an outbound roamer. Different IMS functions may be reserved for different types of UEs. For example, an MVNO subscriber may be assigned an APN/DNN corresponding to IMS function 142, whereas a home (non-roaming) subscriber may be assigned an APN/DNN corresponding to IMS function 146. There may be similar set of IMS functions for roamers (also based on the roaming partner), peering network users, partner carrier users, prepaid versus postpaid accounts, cellular technology (e.g., 5G versus 4G users), and UEs located in certain countries. Some UEs may be assigned an SOS-only function for an emergency call, from SOS MGW pool 150. An example of this is a UE with no subscriber identity module (SIM) that is attempting to place a 911 call.

Different resources may thus be available for the different UEs based on the APN/DNN assigned to the UE, including different codecs (e.g., voice and video codecs), resource management for internet of things (IoT) and mobile-to-mobile (M2M) devices and communications, access to artificial intelligence (AI), machine learning (ML), and generative AI services, and other.

After attachment, upon being assigned an APN/DNN, UE 102 transmits a SIP message (e.g., a SIP Register) to the IMS function associated with the APN/DNN. This SIP message passes through proxy node 117. However, this SIP message has only the IP address of the assigned IMS function (e.g., the IP address of IMS function 142). The actual APN/DNN (generically, network name) is not included within the SIP message to IMS function 142—at least as transmitted by UE 102.

However, in some examples of architecture 100, APN assignment logic 120 adds the APN/DNN (e.g., network name 132) into the SIP message. Proxy node 117 uses APN awareness logic 122 to extract network name 132 (the APN/DNN), and caches it. In some examples, APN awareness logic 122 retrieves network name 132 by subscribes APN information from policy node 114. This is done using a diameter request (Rx interface) in 4G or http (N5 interface) in 5G. Policy node 114 retrieves network name 132 from session management node 113, and sends network name 132 to proxy node 117. With either approach, proxy node 117 has network name 132.

Proxy node 117 uses policies 130 to determine which resources within IMS 140 to permit UE 102 to access. Policies 130 has a set of policies 131 associated with a plurality of network names 133. Plurality of network names 133 includes network name 132 for IMS function 142 and a network name 136 for IMS function 146. A policy 134a and a policy 134b are for UEs assigned to network name 132, and a policy 138a and a policy 138b are for UEs assigned to network name 136.

In the illustrated example scenario, IMS function 142 is an IMS function for UEs using an MVNO, and has an EVS codec as resource 144a and an AMR-NB codec as resource 144b. (IMS function 142 is able to transcode or access a transcoder, and may also offer AMS-WB as another resource.) Network name 132 is for IMS function 142, and policy 134a states that resource 144a (EVS codec) is prohibited and policy 134b states that resource 144b (AMR-NB codec) is permitted. UE 102 is an MVNO subscriber, and so is assigned to IMS function 142. Thus, UE 102 is prohibited from using EVS on wireless network 110, but is permitted to use AMR-NB.

Also in the illustrated example scenario, IMS function 146 is an IMS function for home subscriber UEs, and is configured similarly to IMS function 142, having an EVS codec as resource 148a and an AMR-NB codec as resource 148b. Network name 136 is for IMS function 146, and policy 138a states that resource 148a (EVS codec) is permitted and policy 138b states that resource 148b (AMR-NB codec) is permitted. UE 104 is a home subscriber, and so is assigned to IMS function 146. Thus, UE 104 is permitted to use both EVS and AMR-NB on wireless network 110. The use of one codec or another may be determined by other factors, such as UE capability and channel quality, but both are permitted.

Proxy node 117 retrieves network name 136 using APN awareness logic 122, either extracting network name 136 from a SIP message sent by UE 104 to IMS function 146, after APN assignment logic 120 inserted network name 136 into the SIP message, or using policy node 114 to retrieve network name 136 from session management node 113.

In some examples, policies may prevent a UE from using a resource not by an outright prohibition, but instead by a prioritization in which an insufficient number of IMS or network resources are available. For example, rather than prohibiting use of an EVS codec, policy 134a de-prioritizes MVNO UEs, using the current loading of wireless network 110 as the determining factor. For example, when loading of wireless network 110 is below a low threshold, MVNO UEs are permitted to use an EVS codec. Meanwhile, policy 138a prioritizes home subscriber UEs, by using a higher threshold (i.e., higher than the low threshold) of the loading of wireless network 110 to permit home subscriber UEs to use an EVS codec. Other resources may be prioritized and other prioritization schemes may be used, such as a count of UEs using a particular resource.

Figure 2:
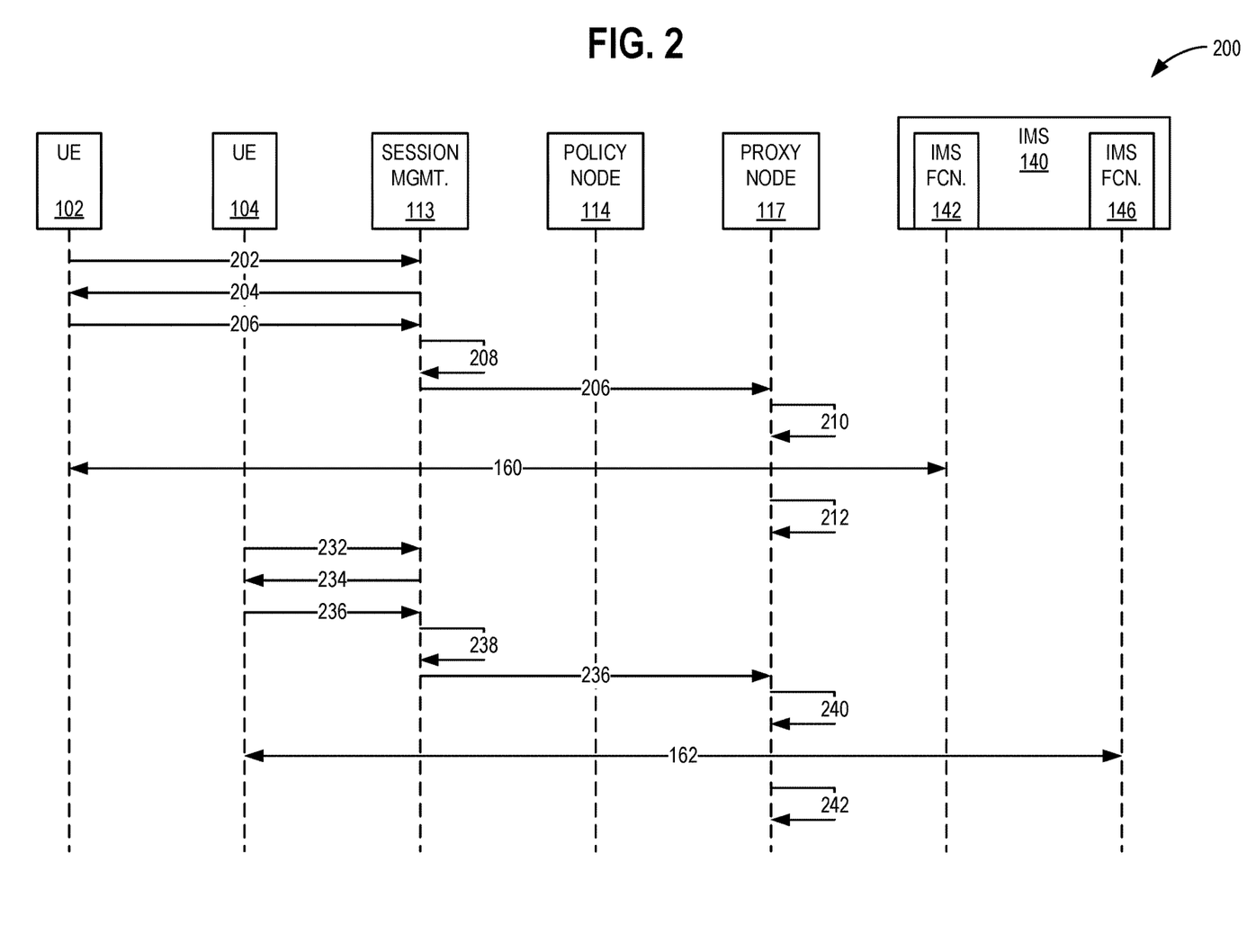
FIG. 2 illustrates a message sequence diagram of messaging that may occur in examples of the architecture of FIG. 1.
Figure 3:
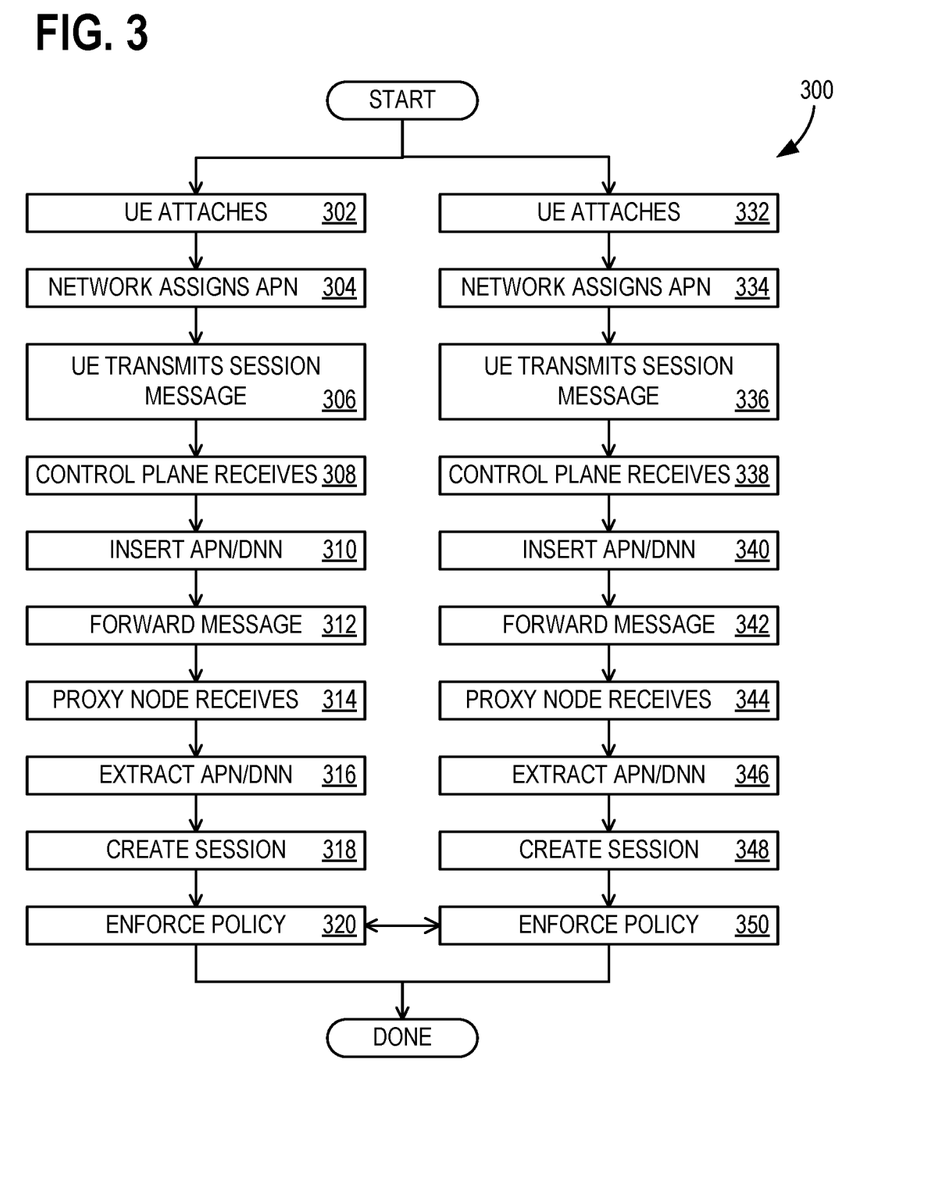
FIG. 3 illustrates a flowchart of exemplary operations associated with the message sequence diagram of FIG. 2 and examples of the architecture of FIG. 1.

FIG. 2 illustrates a message sequence diagram 200 of messaging that may occur in examples of architecture 100, and FIG. 3 illustrates a flowchart 300 of exemplary operations associated with message sequence diagram 200 occurring within architecture 100. FIGS. 2 and 3 are described together. In some examples, at least a portion of flowchart 300 may be performed using one or more computing devices 700 of FIG. 7.

Flowchart 300 commences with UE 102 attaching to wireless network 110 in operation 302, which is shown as message 202 in message sequence diagram 200 of FIG. 2. Session management node 113 (a control plane node) assigns network name 132 to UE 102 in operation 304, and transmits the IP address of IMS function 142 (which corresponds to network name 132) to UE 102 as message 204.

UE 102 transmits session message 206 to IMS function 142 in operation 306. In some examples, session message 206 comprises a SIP message, such as a SIP Register or a SIP Invite. Because session message 206 is a signaling message, it passes through control plane 115 of wireless network and is received by session management node 113 in operation 308. In operation 310, session management node 113 inserts network name 132 into session message 206. This is shown as message 208. In some examples, network name 132 includes an operator identifier field. In some examples, access node 112 inserts network name 132 into session message 206. In some examples, session management node 113 or access node 112 generates a new session message and inserts network name 132 into the new session message.

Session management node 113 forwarding session message 206 with network name 132 to proxy node 117 in operation 312, and proxy node 117 receives session message 206 in operation 314. Session message 206 contains both an indication of UE 102 and also network name 132. Proxy node 117 extracts network name 132 and the identity of UE 102 from session message 206 in operation 316. This is shown as message 210.

Wireless network 110 creates data session 160 for UE 102 in operation 318. Data session 160 passes through proxy node 117, carrying data traffic between UE 102 and IMS 140. In operation 320, proxy node 117 enforces policy 134a associated with network name 132 for data session 160, based on at least network name 132 and set of policies 131 associated with plurality of network names 133 (specifically policies 134a and 134b associated with network name 132). This is shown as message 212. In some examples, policy 134a prevents use of a resource by UE 102, such as a codec, WiFi calling, or another resource (e.g., resource 144a).

UE 104 attaches to wireless network 110 in operation 332, which is shown as message 232. Session management node 113 assigns network name 136 to UE 104 in operation 334, and transmits the IP address of IMS function 142 (which corresponds to network name 136) to UE 104 as message 234.

UE 104 transmits session message 236 to IMS function 142 in operation 336. In some examples, session message 236 comprises a SIP message, such as a SIP Register or a SIP Invite. Because session message 236 is a signaling message, it passes through control plane 115 of wireless network and is received by session management node 113 in operation 338. In operation 340, session management node 113 inserts network name 136 into session message 236. This is shown as message 238. In some examples, network name 136 includes an operator identifier field. In some examples, access node 112 inserts network name 136 into session message 236. In some examples, session management node 113 or access node 112 generates a new session message and inserts network name 136 into the new session message.

Session management node 113 forwarding session message 236 with network name 136 to proxy node 117 in operation 342, and proxy node 117 receives session message 236 in operation 344. Session message 236 contains both an indication of UE 104 and also network name 136. Proxy node 117 extracts network name 136 and the identity of UE 104 from session message 236 in operation 346. This is shown as message 240.

Wireless network 110 creates data session 162 for UE 104 in operation 348. Data session 162 passes through proxy node 117, carrying data traffic between UE 104 and IMS 140. In operation 350, proxy node 117 enforces policy 138a associated with network name 136 for data session 160, based on at least network name 136 and set of policies 131 associated with plurality of network names 133 (specifically policies 138a and 138b associated with network name 136). This is shown as message 242. In some examples, policy 138a permits use of a resource by UE 104, such as a codec, WiFi calling, or another resource (e.g., resource 148a) that had been prevented for UE 102 (e.g., by policy 134a).

In some examples, policy 134a prevents use of a resource by UE 102 and policy 138a permits use of the same or an equivalent resource by UE 104 as a consequence of prioritizing UE 104 over UE 102 for use of that resource, whereas in some examples policy 134a outright prohibits use of resource 144a (independently of prioritization). For example, in scenarios of prioritization, policy 134a may permit UE 102 to use a certain codec when bandwidth demand on wireless network is low, whereas policy 138a permits UE 104 to use that same codec even when bandwidth demand on wireless network is higher.

Figure 4:
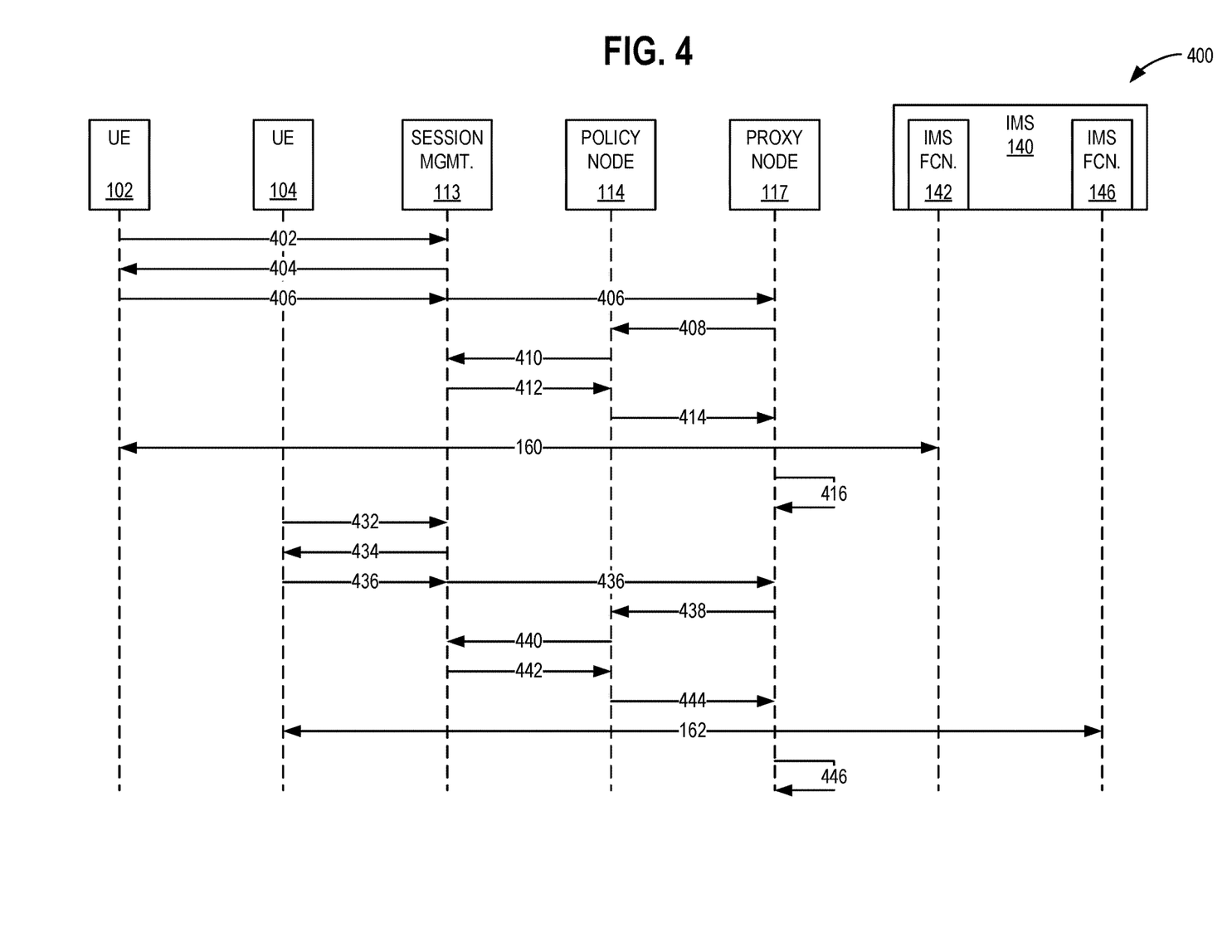
FIG. 4 illustrates a message sequence diagram of messaging that may occur in examples of the architecture of FIG. 1, in an alternate form of operation.
Figure 5:
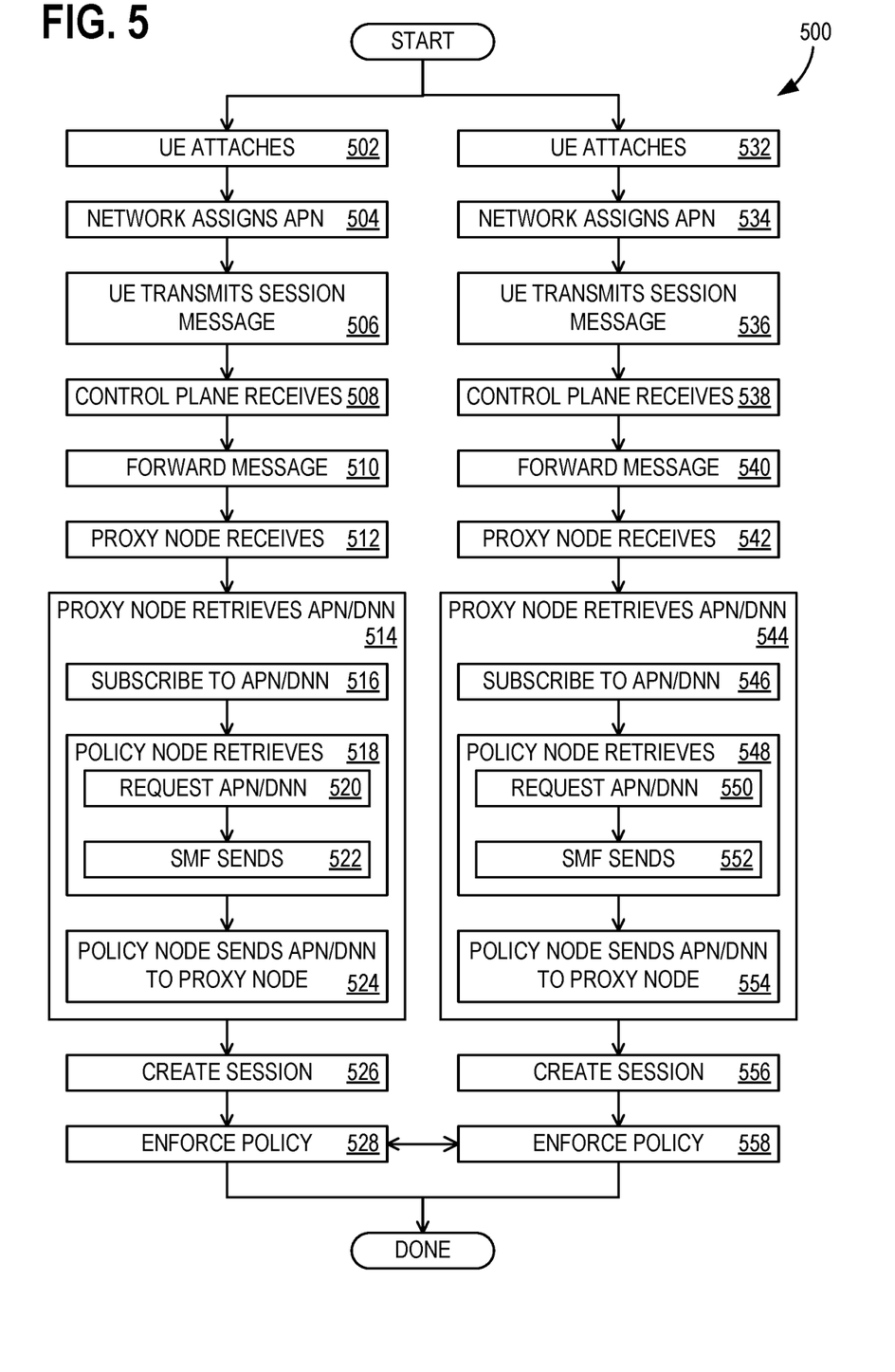
FIG. 5 illustrates a flowchart of exemplary operations associated with the message sequence diagram of FIG. 4 and examples of the architecture of FIG. 1.

FIG. 4 illustrates a message sequence diagram 400 of messaging that may occur in examples of architecture 100, in an alternate form of operation, and FIG. 5 illustrates a flowchart 500 of exemplary operations associated with message sequence diagram 400 occurring within architecture 100. FIGS. 4 and 5 are described together. In some examples, at least a portion of flowchart 500 may be performed using one or more computing devices 700 of FIG. 7. In some examples, the messages of message sequence diagrams 200 and 400 and the operations of flowcharts 300 and 500 may be blended into a combined form of operation.

Flowchart 500 commences with UE 102 attaching to wireless network 110 in operation 502, which is shown as message 402 in message sequence diagram 400 of FIG. 4. Session management node 113 assigns network name 132 to UE 102 in operation 504, and transmits the IP address of IMS function 142 to UE 102 as message 404.

UE 102 transmits session message 406 to IMS function 142 in operation 506. In some examples, session message 406 comprises a SIP message, such as a SIP Register or a SIP Invite. Because session message 406 is a signaling message, it passes through control plane 115 of wireless network 110. Session management node 113 receives session message 406 from UE 102 in operation 508 and forwards session message 406 (without network name 132 in this sequence of operations) to proxy node 117 in operation 510. Proxy node 117 receives session message 406, which has an indication of UE 102 and the IP address of IMS function 142 (but not network name 132) in operation 512.

Proxy node 117 retrieves network name 132 from policy node 114 in operation 514, which may be performed using operations 516-524. In operation 516, proxy node 117 subscribes to APN/DNN information with policy node 114, which is shown as message 408. Policy node 114 retrieves network name 132 from session management node 113 in operation 518, which in some examples is performed using operations 520 and 522. In some examples, policy node 114 pulls APN/DNN information from session management node 113 by requesting the APN/DNN information (which includes network name 132) in operation 520. This is shown as message 410.

In operation 522, session management node 113 transmits network name 132 to policy node 114 as message 412. In some examples, this is in response to message 410, whereas in some examples, session management node 113 pushes APN/DNN information to policy node 114. In operation 524, policy node 114 transmits network name 132 to proxy node 117 as message 414.

Wireless network 110 creates data session 160 for UE 102 in operation 526. Data session 160 passes through proxy node 117, carrying data traffic between UE 102 and IMS 140. In operation 528, proxy node 117 enforces policy 134a associated with network name 132 for data session 160, based on at least network name 132 and set of policies 131 associated with plurality of network names 133 (specifically policies 134a and 134b associated with network name 132). This is shown as message 416. In some examples, policy 134a prevents use of a resource by UE 102, such as a codec, WiFi calling, or another resource (e.g., resource 144a).

UE 104 attaches to wireless network 110 in operation 532, which is shown as message 432. Session management node 113 assigns network name 132 to UE 104 in operation 534, and transmits the IP address of IMS function 142 to UE 104 as message 434. UE 104 transmits session message 436 to IMS function 142 in operation 536. In some examples, session message 436 comprises a SIP message, such as a SIP Register or a SIP Invite. Because session message 436 is a signaling message, it passes through control plane 115 of wireless network 110.

Session management node 113 receives session message 436 from UE 104 in operation 538 and forwards session message 436 (without network name 136 in this sequence of operations) to proxy node 117 in operation 540. Proxy node 117 receives session message 436, which has an indication of UE 104 and the IP address of IMS function 142 (but not network name 136) in operation 542.

Proxy node 117 retrieves network name 136 from policy node 114 in operation 544, which may be performed using operations 546-554. In operation 546, proxy node 117 subscribes to APN/DNN information with policy node 114, which is shown as message 438. Policy node 114 retrieves network name 136 from session management node 113 in operation 548, which in some examples is performed using operations 550 and 552. In some examples, policy node 114 pulls APN/DNN information from session management node 113 by requesting the APN/DNN information (which includes network name 136) in operation 550. This is shown as message 440.

In operation 552, session management node 113 transmits network name 136 to policy node 114 as message 442. In some examples, this is in response to message 440, whereas in some examples, session management node 113 pushes APN/DNN information to policy node 114. In operation 554, policy node 114 transmits network name 136 to proxy node 117 as message 444.

Wireless network 110 creates data session 162 for UE 104 in operation 556. Data session 162 passes through proxy node 117, carrying data traffic between UE 104 and IMS 140. In operation 558, proxy node 117 enforces policy 138a associated with network name 136 for data session 162, based on at least network name 136 and set of policies 131 associated with plurality of network names 133 (specifically policies 138a and 138b associated with network name 136). This is shown as message 446.

Figure 6A:
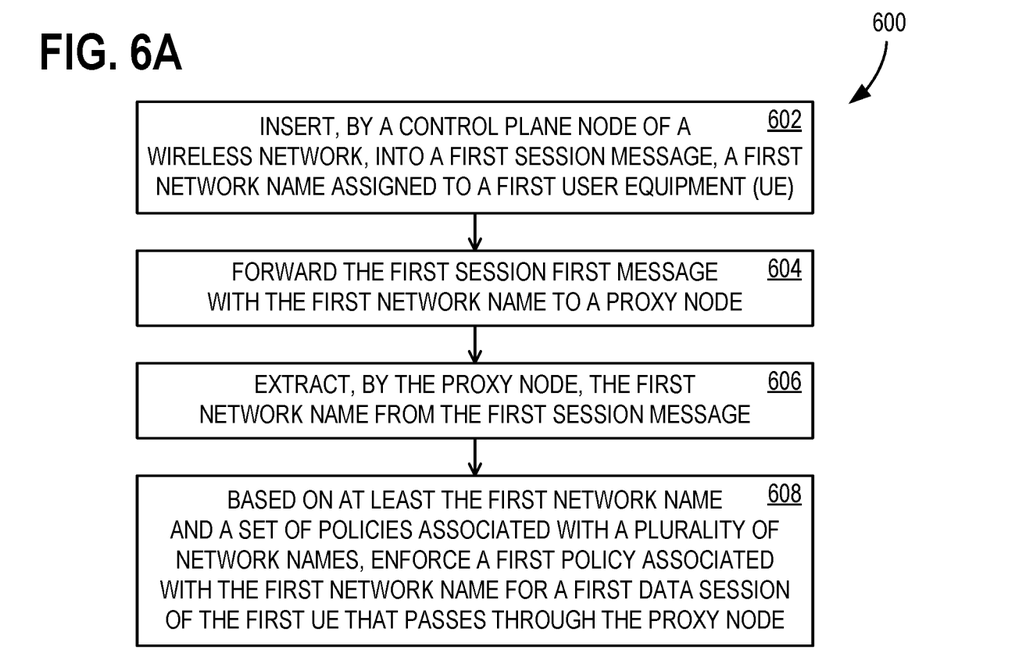
FIGS. 6A and 6B illustrate additional flowcharts of exemplary operations associated with the architecture of FIG. 1.

FIG. 6A illustrates a flowchart 600 of exemplary operations associated with examples of architecture 100. In some examples, at least a portion of flowchart 600 may be performed using one or more computing devices 700 of FIG. 7. Flowchart 600 commences with operation 602, which includes inserting, by a control plane node of a wireless network, into a first session message, a first network name assigned to a first UE.

Operation 604 includes forwarding the first session message with the first network name to a proxy node. Operation 606 includes extracting, by the proxy node, the first network name from the first session message. Operation 608 includes, based on at least the first network name and a set of policies associated with a plurality of network names, enforcing a first policy associated with the first network name for a first data session of the first UE that passes through the proxy node.

Figure 6B:
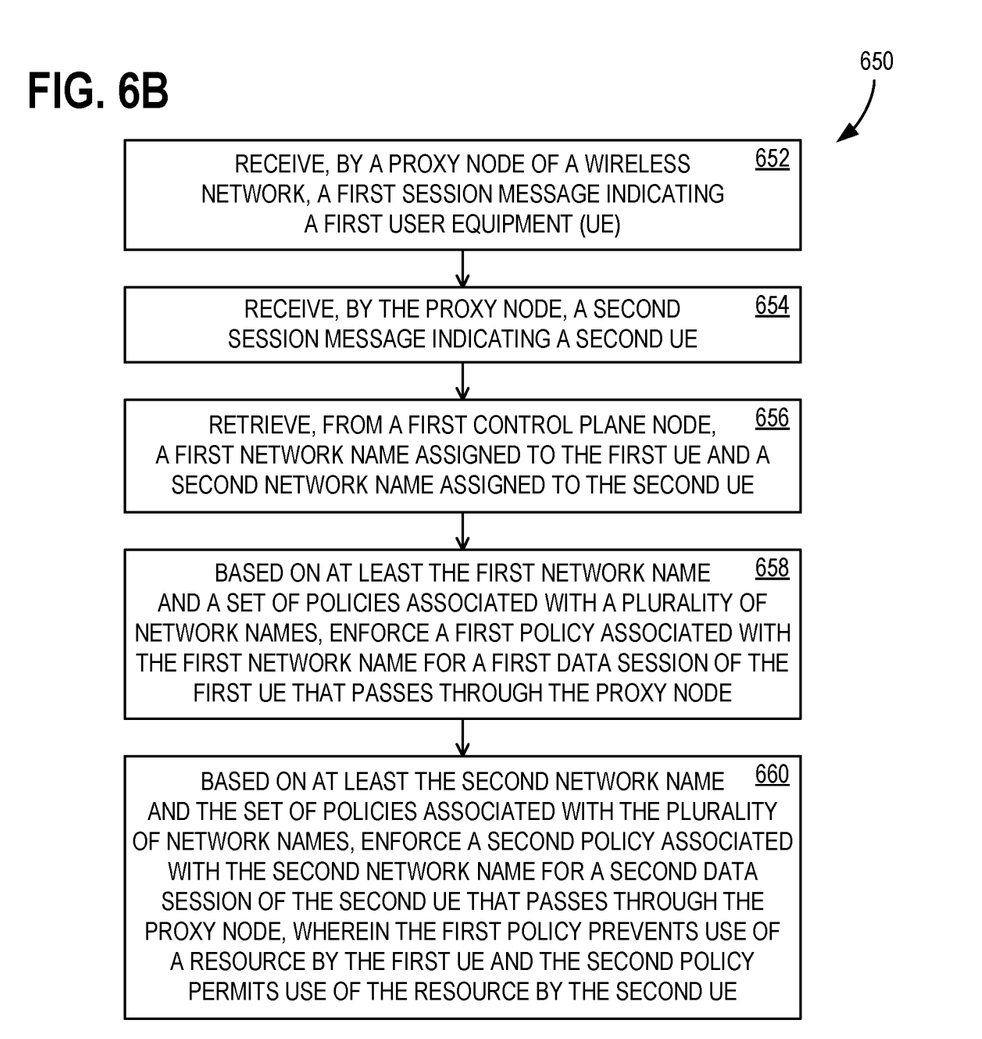

FIG. 6B illustrates a flowchart 650 of exemplary operations associated with examples of architecture 100. In some examples, at least a portion of flowchart 650 may be performed using one or more computing devices 700 of FIG. 7. Flowchart 650 commences with operation 652, which includes receiving, by a proxy node of a wireless network, a first session message indicating a first UE. Operation 654 includes receiving, by the proxy node, a second session message indicating a second UE.

Operation 656 includes retrieving, from a first control plane node, a first network name assigned to the first UE and a second network name assigned to the second UE. Operation 658 includes, based on at least the first network name and a set of policies associated with a plurality of network names, enforcing a first policy associated with the first network name for a first data session of the first UE that passes through the proxy node. Operation 660 includes, based on at least the second network name and the set of policies associated with the plurality of network names, enforcing a second policy associated with the second network name for a second data session of the second UE that passes through the proxy node, wherein the first policy prevents use of a resource by the first UE and the second policy permits use of the resource by the second UE.

Figure 7:
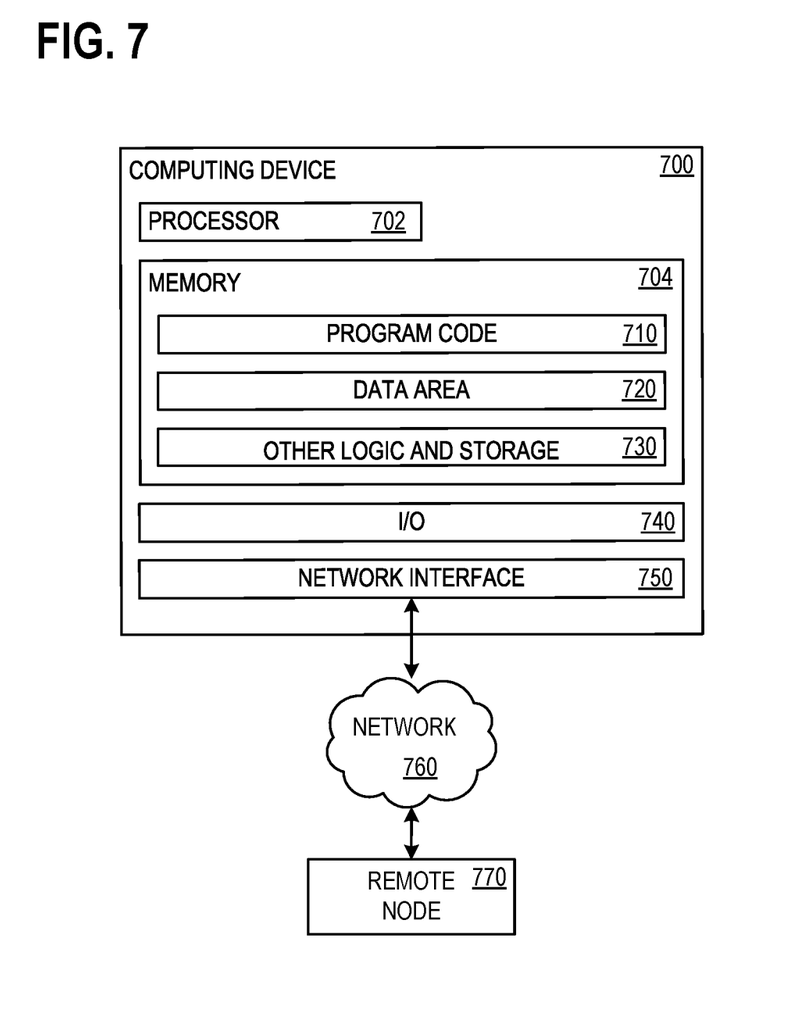
FIG. 7 illustrates a block diagram of a computing device suitable for implementing various aspects of the disclosure.

FIG. 7 illustrates a block diagram of computing device 700 that may be used as any component described herein that may require computational or storage capacity. Computing device 700 has at least a processor 702 and a memory 704 that holds program code 710, data area 720, and other logic and storage 730. Memory 704 is any device allowing information, such as computer executable instructions and/or other data, to be stored and retrieved. For example, memory 704 may include one or more random access memory (RAM) modules, flash memory modules, hard disks, solid-state disks, persistent memory devices, and/or optical disks. Program code 710 comprises computer executable instructions and computer executable components including instructions used to perform operations described herein. Data area 720 holds data used to perform operations described herein. Memory 704 also includes other logic and storage 730 that performs or facilitates other functions disclosed herein or otherwise required of computing device 700. An input/output (I/O) component 740 facilitates receiving input from users and other devices and generating displays for users and outputs for other devices. A network interface 750 permits communication over external network 760 with a remote node 770, which may represent another implementation of computing device 700. For example, a remote node 770 may represent another of the above-noted nodes within architecture 100.

Additional Examples

An example system comprises: a processor; and a computer-readable medium storing instructions that are operative upon execution by the processor to: insert, by a control plane node of a wireless network, into a first session message, a first network name assigned to a first UE: forward the first session message with the first network name to a proxy node; extract, by the proxy node, the first network name from the first session message; and based on at least the first network name and a set of policies associated with a plurality of network names, enforce a first policy associated with the first network name for a first data session of the first UE that passes through the proxy node.

An example method of wireless communication comprises: inserting, by a control plane node of a wireless network, into a first session message, a first network name assigned to a first UE; forwarding the first session message with the first network name to a proxy node: extracting, by the proxy node, the first network name from the first session message; and based on at least the first network name and a set of policies associated with a plurality of network names, enforcing a first policy associated with the first network name for a first data session of the first UE that passes through the proxy node.

One or more example computer storage devices has computer-executable instructions stored thereon, which, upon execution by a computer, cause the computer to perform operations comprising: inserting, by a control plane node of a wireless network, into a first session message, a first network name assigned to a first UE; forwarding the first session message with the first network name to a proxy node: extracting, by the proxy node, the first network name from the first session message; and based on at least the first network name and a set of policies associated with a plurality of network names, enforcing a first policy associated with the first network name for a first data session of the first UE that passes through the proxy node.

Another example system comprises: a processor; and a computer-readable medium storing instructions that are operative upon execution by the processor to: receive, by a proxy node of a wireless network, a first session message indicating a first UE; receive, by the proxy node, a second session message indicating a second UE; retrieve, from a first control plane node, a first network name assigned to the first UE and a second network name assigned to the second UE; based on at least the first network name and a set of policies associated with a plurality of network names, enforce a first policy associated with the first network name for a first data session of the first UE that passes through the proxy node; and based on at least the second network name and the set of policies associated with the plurality of network names, enforce a second policy associated with the second network name for a second data session of the second UE that passes through the proxy node, wherein the first policy prevents use of a resource by the first UE and the second policy permits use of the resource by the second UE.

Another example method of wireless communication comprises: receiving, by a proxy node of a wireless network, a first session message indicating a first UE: receiving, by the proxy node, a second session message indicating a second UE; retrieving, from a first control plane node, a first network name assigned to the first UE and a second network name assigned to the second UE: based on at least the first network name and a set of policies associated with a plurality of network names, enforcing a first policy associated with the first network name for a first data session of the first UE that passes through the proxy node; and based on at least the second network name and the set of policies associated with the plurality of network names, enforcing a second policy associated with the second network name for a second data session of the second UE that passes through the proxy node, wherein the first policy prevents use of a resource by the first UE and the second policy permits use of the resource by the second UE.

One or more example computer storage devices has computer-executable instructions stored thereon, which, upon execution by a computer, cause the computer to perform operations comprising: receiving, by a proxy node of a wireless network, a first session message indicating a first UE: receiving, by the proxy node, a second session message indicating a second UE: retrieving, from a first control plane node, a first network name assigned to the first UE and a second network name assigned to the second UE; based on at least the first network name and a set of policies associated with a plurality of network names, enforcing a first policy associated with the first network name for a first data session of the first UE that passes through the proxy node; and based on at least the second network name and the set of policies associated with the plurality of network names, enforcing a second policy associated with the second network name for a second data session of the second UE that passes through the proxy node, wherein the first policy prevents use of a resource by the first UE and the second policy permits use of the resource by the second UE.

Alternatively, or in addition to the other examples described herein, examples include any combination of the following:

inserting, by the control plane node, into a second session message, a second network name assigned to a second UE, the second network name different from the first network name;
forwarding the second session message with the second network name to the proxy node;
extracting, by the proxy node, the second network name from the second session message;
based on at least the second network name and the set of policies associated with the plurality of network names, enforcing a second policy associated with the second network name for a second data session of the second UE that passes through the proxy node;
the first policy prevents use of a resource by the first UE and the second policy permits use of the resource by the second UE;
the first policy prevents use of the resource by the first UE and the second policy permits use of the resource by the second UE as a consequence of prioritizing the second UE over the first UE for use of the resource;
the first policy prevents use of a codec by the first UE;
the codec comprises an EVS codec or an AMD-WB codec;
the first network name comprises an APN or a DNN;
the control plane node comprises a PGW or an SMF;
the proxy node comprises a P-CSCF;
the first session message comprises a SIP message;
the first session message comprises a SIP Register or a SIP Invite;
the first data session carries data traffic to and from an IMS;
retrieving, by the first control plane node, from a second control plane node, the first network name and the second network name;
the second network name comprises an APN or a DNN;
the first control plane node comprises a PCRF or a PCF;
the second control plane node comprises a PGW or an SMF;
the second session message comprises a SIP message;
the second session message comprises a SIP Register or a SIP Invite;
the first UE attaches to the wireless network;
the second UE attaches to the wireless network;
assigning, by the control plane node, to the first UE, the first network name;
assigning, by the control plane node, to the second UE, the second network name;
the first network name and the second network name each includes an operator identifier field;
the control plane node comprises a PGW-C
the control plane node comprises an MME or an AMF;
the first UE transmits the first session message to a network node (IMS function) corresponding to the first network name;
the second UE transmits the second session message to a network node (IMS function) corresponding to the second network name;
receiving, by the control plane node, the first session message from the first UE and the second session message from the second UE;
the control plane node generates the first session message and the second session message;
the control plane node forwards the first session message and the second session message;
forwarding the first session message to the proxy node comprises forwarding the session message through another control plane node of the wireless network;
receiving, by the proxy node, the first session message;
receiving, by the proxy node, the second session message;
creating the first data session;
creating the second data session; and
the first policy prohibits use of the resource by the first UE.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:
   inserting, by a control plane node of a wireless network, into a first session message, a first network name assigned to a first user equipment (UE), wherein the control plane node comprises a packet gateway (PGW) or a session management function (SMF), wherein the first network name comprises an access point name (APN) or a data network name (DNN), and wherein the first session message comprises a first session initiation protocol (SIP) message;
   forwarding the first session message with the first network name to a proxy node, wherein the proxy node comprises a proxy-call session control function (P-CSCF);
   extracting, by the proxy node, the first network name from the first session message; and
   based on at least the first network name and a set of policies associated with a plurality of network names, enforcing a first policy associated with the first network name for a first data session of the first UE that passes through the proxy node, wherein the first policy prevents use of a codec by the first UE.

2. The method of claim 1, further comprising:
   inserting, by the control plane node, into a second session message, a second network name assigned to a second UE, the second network name different from the first network name;
   forwarding the second session message with the second network name to the proxy node;
   extracting, by the proxy node, the second network name from the second session message; and
   based on at least the second network name and the set of policies associated with the plurality of network names, enforcing a second policy associated with the second network name for a second data session of the second UE that passes through the proxy node, wherein the first policy prevents use of a resource by the first UE and the second policy permits use of the resource by the second UE.

3. The method of claim 2, wherein the first policy prevents use of the resource by the first UE and the second policy permits use of the resource by the second UE as a consequence of prioritizing the second UE over the first UE for use of the resource.

4. The method of claim 2, wherein the second policy permits use of the codec by the second UE.

5. The method of claim 4, wherein the codec comprises an enhanced voice services (EVS) codec or an adaptive multi-rate (AMR) wideband (AMD-WB) codec.

6. The method of claim 1,
   wherein the first data session carries data traffic to and from an internet protocol (IP) multimedia subsystem (IMS).

7. The method of claim 1, wherein the first session message comprises a SIP Register or a SIP Invite.

8. A system comprising:
   a processor; and
   a computer-readable medium storing instructions that are operative upon execution by the processor to:
      insert, by a control plane node of a wireless network, into a first session message, a first network name assigned to a first user equipment (UE), wherein the control plane node comprises a packet gateway (PGW) or a session management function (SMF), wherein the first network name comprises an access point name (APN) or a data network name (DNN), and wherein the first session message comprises a first session initiation protocol (SIP) message;
      forward the first session message with the first network name to a proxy node, wherein the proxy node comprises a proxy-call session control function (P-CSCF);
      extract, by the proxy node, the first network name from the first session message; and
      based on at least the first network name and a set of policies associated with a plurality of network names, enforce a first policy associated with the first network name for a first data session of the first UE that passes through the proxy node, wherein the first policy prevents use of a codec by the first UE.

9. The system of claim 8, wherein the instructions are further operative to:
   insert, by the control plane node, into a second session message, a second network name assigned to a second UE, the second network name different from the first network name;
   forward the second session message with the second network name to the proxy node;
   extract, by the proxy node, the second network name from the second session message; and
   based on at least the second network name and the set of policies associated with the plurality of network names, enforce a second policy associated with the second network name for a second data session of the second UE that passes through the proxy node, wherein the first policy prevents use of a resource by the first UE and the second policy permits use of the resource by the second UE.

10. The system of claim 9, wherein the first policy prevents use of the resource by the first UE and the second policy permits use of the resource by the second UE as a consequence of prioritizing the second UE over the first UE for use of the resource.

11. The system of claim 9, wherein the second policy permits use of the codec by the second UE.

12. The system of claim 11, wherein the codec comprises an enhanced voice services (EVS) codec or an adaptive multi-rate (AMR) wideband (AMD-WB) codec.

13. The system of claim 8,
    wherein the first data session carries data traffic to and from an internet protocol (IP) multimedia subsystem (IMS).

14. The system of claim 8, wherein the first session message comprises a SIP Register or a SIP Invite.

15. One or more computer storage devices having computer-executable instructions stored thereon, which, upon execution by a computer, cause the computer to perform operations comprising:
    inserting, by a control plane node of a wireless network, into a first session message, a first network name assigned to a first user equipment (UE), wherein the control plane node comprises a packet gateway (PGW)

or a session management function (SMF), wherein the first network name comprises an access point name (APN) or a data network name (DNN), and wherein the first session message comprises a first session initiation protocol (SIP) message;

forwarding the first session message with the first network name to a proxy node, wherein the proxy node comprises a proxy-call session control function (P-CSCF);

extracting, by the proxy node, the first network name from the first session message; and based on at least the first network name and a set of policies associated with a plurality of network names, enforcing a first policy associated with the first network name for a first data session of the first UE that passes through the proxy node, wherein the first policy prevents use of a codec by the first UE.

16. The one or more computer storage devices of claim 15, wherein the operations further comprise:

inserting, by the control plane node, into a second session message, a second network name assigned to a second UE, the second network name different from the first network name;

forwarding the second session message with the second network name to the proxy node;

extracting, by the proxy node, the second network name from the second session message; and based on at least the second network name and the set of policies associated with the plurality of network names, enforcing a second policy associated with the second network name for a second data session of the second UE that passes through the proxy node, wherein the first policy prevents use of a resource by the first UE and the second policy permits use of the resource by the second UE.

17. The one or more computer storage devices of claim 16, wherein the first policy prevents use of the resource by the first UE and the second policy permits use of the resource by the second UE as a consequence of prioritizing the second UE over the first UE for use of the resource.

18. The one or more computer storage devices of claim 16, wherein the second policy permits use of the codec by the second UE.

19. The one or more computer storage devices of claim 18, wherein the codec comprises an enhanced voice services (EVS) codec or an adaptive multi-rate (AMR) wideband (AMD-WB) codec.

20. The one or more computer storage devices of claim 15, wherein the first data session carries data traffic to and from an internet protocol (IP) multimedia subsystem (IMS).

* * * * *